J. A. WHIPPLE.
THILL-COUPLING.
No. 194,020.  Patented Aug. 7, 1877.
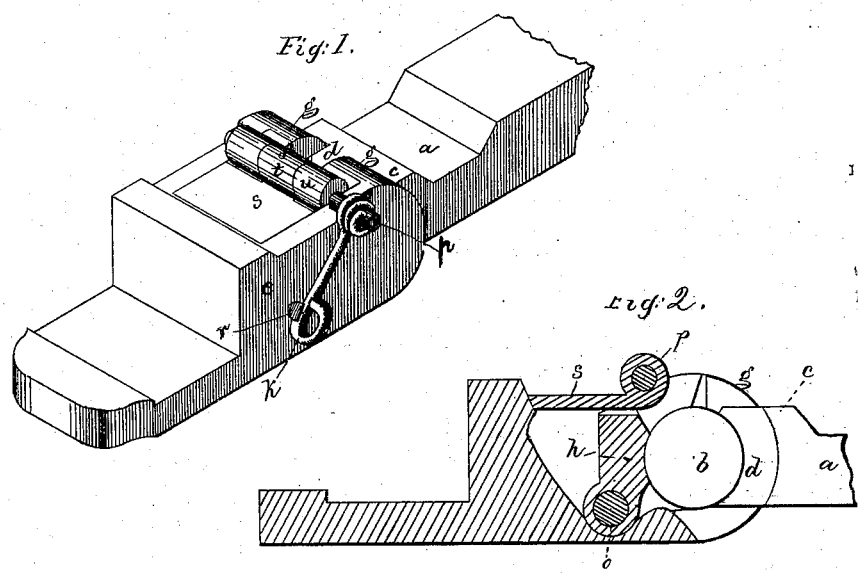
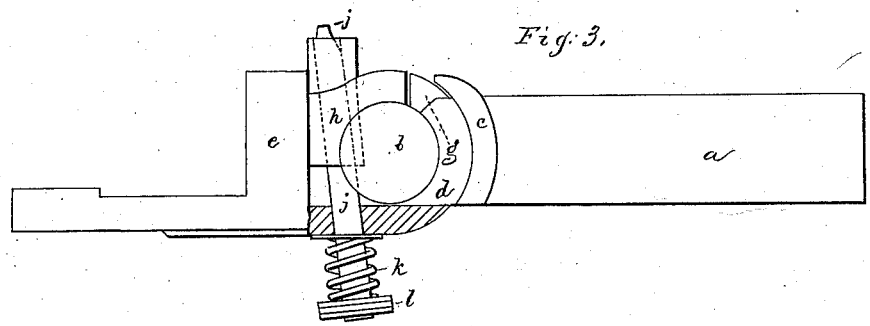
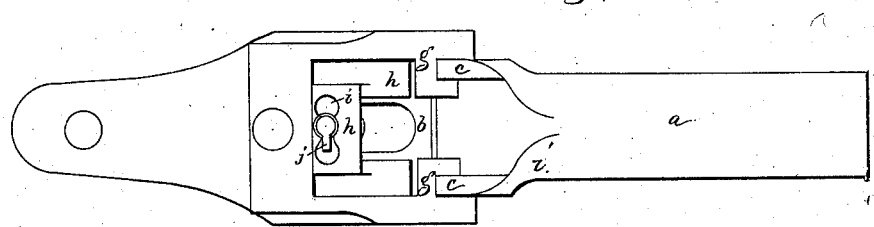
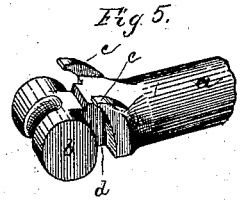
Witnesses,
L. H. Latimer.
C. C. Perkins.
Inventor
John A Whipple
per Crosby & Gregory Atty

UNITED STATES PATENT OFFICE.

JOHN A. WHIPPLE, OF CAMBRIDGE, MASSACHUSETTS.

IMPROVEMENT IN THILL-COUPLINGS.

Specification forming part of Letters Patent No. 194,020, dated August 7, 1877; application filed April 17, 1877.

*To all whom it may concern:*

Be it known that I, JOHN A. WHIPPLE, of Cambridge, county of Middlesex, and State of Massachusetts, have invented Improvements in Shaft-Shackle, of which the following is a specification:

This invention relates to improvements in shaft-shackle; and has for its object the production of a shackle which will dispense with nuts and bolts, will readily permit the removal of shafts or poles when elevated, as herein described, and which will not rattle.

In this invention the shaft-iron is provided with a cylindrical head and a guard, and the head is fitted into a socket in the clip part of the shackle, where it is operated upon by a metallic packing-block held in position by a spring.

Figure 1 represents the invention in perspective; Fig. 2, a partial section; Fig. 3, a view of a modified form of shackle, the part being partially in section; Fig. 4, a top view thereof, and Fig. 5 an end view of the shaft-iron.

In the drawing, the shaft-iron $a$, or part to be connected with the shaft, has a cylindrical end, $b$, and a guard, $c$, and a curved groove made between the guard and cylindrical portion, receives within it the rounded front portion $g$ of the clip part $e$, or that part of the shackle to be applied to the axle.

The forward part of the clip is recessed at top to receive the cylindrical end $b$ of the shaft-iron, and the narrow part $d$ between the head $b$ and guard $c$ enters a vertical slot cut in the forward part of the clip.

Behind the cylindrical portion, and within the clip, is applied a metallic packing, $h$, adapted to be held by a spring, $k$, closely against the portion $b$, so as to cover its rear side.

The packing, as shown in Figs. 1 and 2, is pivoted at $o$, and has at its upper end a rod, $p$, to which is attached the spring $k$.

At the side of the clip is a holding-pin, $r$, below which the spring may be caught, so as to hold the packing pressed with a yielding pressure against the portion $b$ of the shaft-iron.

I propose, in order to exclude mud, snow, &c., to attach to the pin $p$ a cover-plate, $s$, adapted, when the spring is caught by the pin $r$, to fit into the opening in the clip, and cover the space back of the packing-block.

The cover-plate is connected with the rod $p$ by means of a pin, $t$, but if the plate $s$ is omitted, as it may be, then the pin will be inserted through a suitable hole made for it in one of the ears $u$, and into the rod.

If desired, this packing-block may be applied back of the portion $b$, so as to be removable entirely from the recess in the clip, when it is desired to charge or disconnect the shafts from the vehicle. Such a form of packing, $h$, is shown in Figs. 3 and 4. It is provided with an opening, $i$, through which is passed the hooked end of a holding-rod, $j$, surrounded with a spiral spring, $k$, having its lower end resting upon a washer, $l$. By moving this rod longitudinally in opposition to the spring $k$, and axially, the hook may be turned to a position the reverse from that shown in Fig. 4, when the block $n$ may be elevated and withdrawn.

The rod and spring hold the packing down snugly against the cylindrical portion $b$.

When the packing is turned back or removed, the shaft may be turned up nearly into a vertical position, and the cylindrical portion $b$ may then be easily lifted out of the recess in the clip.

I claim—

1. The shaft-iron $a$, and its cylindrical end $b$ and guard $c$, in combination with a clip part, $e$, metallic packing $h$, and a spring to hold it pressed against the end $b$, substantially as described.

2. The shaft-iron $a$, provided with the cylindrical end $b$ and guard $c$, in combination with the clip part $e$, and metallic packing-block cover-plate pivoted on the packing-block, and spring, substantially as described.

In testimony whereof I have signed my name to this specification in the presence of two subscribing witnesses.

JOHN A. WHIPPLE.

Witnesses:
G. W. GREGORY,
E. C. PERKINS.